March 13, 1951

C. HAGEDORN 2,545,276

BRAKE LINING THICKNESS INDICATOR

Filed Oct. 7, 1946

Inventor

Carl Hagedorn

By Clarence A. O'Brien
and Harvey B. Jacobson
Attorneys

Patented Mar. 13, 1951

2,545,276

UNITED STATES PATENT OFFICE 2,545,276

BRAKE LINING THICKNESS INDICATOR

Carl Hagedorn, Everett, Wash.

Application October 7, 1946, Serial No. 701,853

2 Claims. (Cl. 188—79.5)

This invention relates to new and useful improvements and structural refinements in brake lining thickness indicators for internal expanding brakes such as are commonly employed on automobiles and similar vehicles, and the principal object of the invention is to provide a device of the character herein described which will readily indicate the extent to which the lining on the brake shoes is worn, thereby warning the operator as to the necessity of relining the brake shoe.

Another object of the invention is to provide a brake lining thickness indicator which is simple in construction and operation, and the position of which on the vehicle facilitates convenient inspection.

A further object of the invention is to provide a brake lining thickness indicator which will readily lend itself to economical manufacture and which is applicable, with equal effectiveness, to both new vehicles, or as an attachment for vehicles already in existence.

With the above more important objects in view, and such other objects as may become apparent as this specification proceeds, the invention consists essentially of the arrangement and construction of parts as illustrated in the accompanying drawings, in which.

Like characters of reference are used to designate like parts in the specification and throughout the several views.

Figure 1:
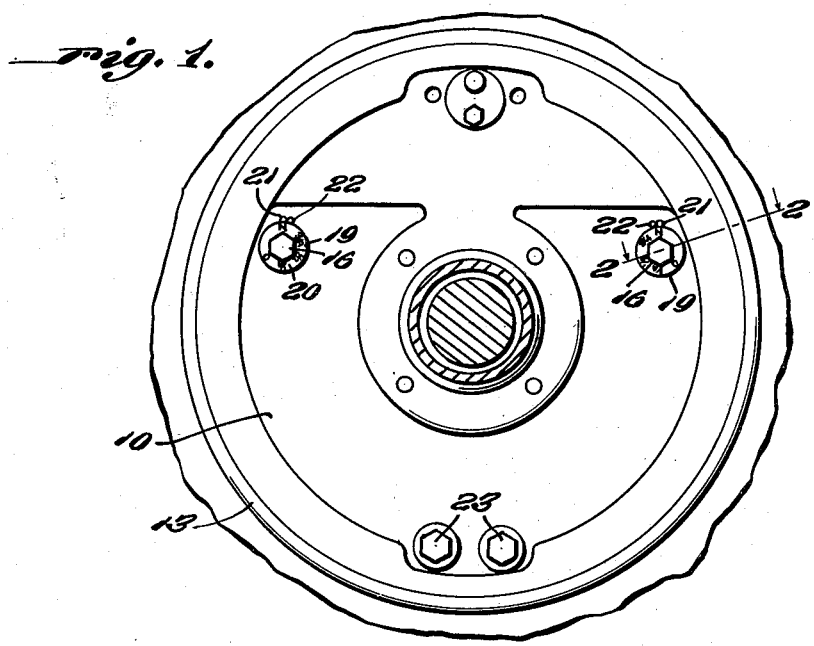
Figure 1 is a side elevation of the invention, showing the same in situ on the brake mechanism.
Figure 2:
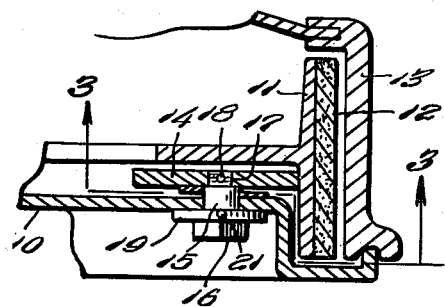
Figure 2 is an enlarged sectional view, taken substantially in the plane of the line 2—2 in Figure 1.
Figure 3:
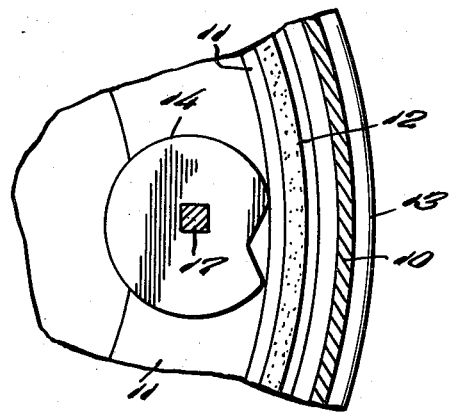
Figure 3 is a cross sectional view, taken substantially in the plane of the line 3—3 in Figure 2.

Referring now to the accompanying drawings in detail, the invention is associated with an internal expanding brake mechanism commonly employed on automobiles and similar vehicles, which includes in its construction a support shield 10, carrying a pair of internal expanding brake shoes, the same being designated by the reference character 11. The shoes 11, of course, are provided with the brake lining 12, this in turn, being frictionally engageable with the brake drum 13 upon actuation of hydraulic of other brake applying means.

The adjustment of the brake shoes 11 is facilitated by the provision of the cam 14, the adjustment, of course, being necessary in order that the brake shoe "setting" may compensate for the progressively diminishing thickness of the brake lining 12, resulting from wear.

Figure 4:
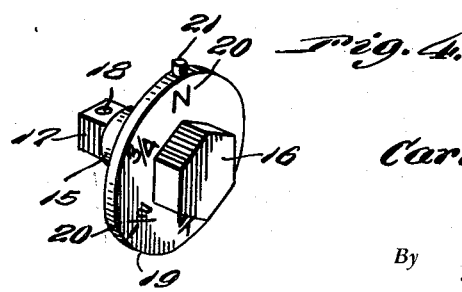
Figure 4 is a perspective view of the adjustment screw and graduated disc used in the invention.

The essence of the invention resides in the provision of a cam actuating member 15, the same being best shown in the accompanying Figure 4 and including a substantially cylindrical shank rotatably mounted in the shield 10 and provided with a wrench receiving portion 16 at one end, while its remaining end is of a substantially square cross sectional configuration as indicated at 17, to receive the aforementioned cam 14.

If desired, the square portion 17 may be formed with a suitable aperture 18 to receive a retaining pin for firmly securing the cam to the actuating member 15.

The cam actuating member 15 is also provided with a disc 19 disposed adjacent the head portion 16, the disc 19 being inscribed with suitable graduations or markings 20.

The disc 19 is also provided with a laterally projecting stop dog 21, which may simply assume the form of a suitable pin secured in the periphery of the disc. A further pin, hereinafter referred to as the index pin 22, is secured to the shield 10 adjacent each of the cam actuating members 15, as will be clearly apparent from the accompanying drawings.

The graduations or markings 20 are so arranged, that when the invention is placed in use and the brake lining 12 is new, the dog 21 will contact the adjacent pin 22 and the letter or character "N" on the disc 19 will be disposed adjacent the index pin (22), thus indicating that the brake lining is new.

As the brake lining continues to wear down and the cam actuating member 15, together with the associated cam 14, is rotated to compensate for the wear, the chronologically descending markings on the disc 19 will effectively indicate the extent of wear. Finally, when the marking "one-quarter" assumes its position adjacent the pin 22, the operator will be informed that only one-quarter of the original thickness of brake lining remains on the brake shoes, and that relining of the shoes should be contemplated at an early date.

It should be understood that while in the accompanying drawings, the invention is shown in association with only the upper shoe adjusting cam, the same may, of course, be applied with equal effectiveness to the lower adjusting cams actuated by the "anchor" bolts 23.

It is believed that the advantages and use of the invention will be clearly understood from the foregoing disclosure and accordingly, further description thereof at this point is considered unnecessary.

While in the foregoing there has been shown and described the preferred embodiment of this invention it is to be understood that minor changes in the details of construction, combination and arrangement of parts may be resorted to without departing from the spirit and scope of the invention as claimed.

What I claim as my invention is:

1. In a vehicle brake including a brake drum, an internal expanding shoe mounted in said drum, a support shield within said drum, and a rotatable adjusting cam engageable with said shoe, a brake thickness indicator comprising a cam actuating member having a substantially cylindrical body portion and a reduced squared inner end, said support shield having an annular opening rotatably receiving the body portion of said cam actuating member, said cam having a substantially square opening for receiving the reduced square end of said cam actuating member, one face of said cam bearing against the body portion of said cam actuating member adjacent the inner square end of the latter, means removably securing said cam on the inner end of said cam actuating member, one end of said body portion projecting outwardly from said shield, a wrench engaging head fixed on the outer end of said body portion, an indicia bearing disc fixed on the outer end of said body portion adjacent said wrench engaging head, a stop lug fixedly carried by said disc, said lug projecting outwardly from the circumferential edge of said disc, and a reference pin fixedly carried by said shield and cooperating with said lug to indicate an adjustment of the cam relative to the shoe and forming an abutment for the stop lug to limit rotation of said cam actuating member in both directions.

2. In association with a vehicle brake including a support shield, an internal expanding shoe, a shaft journaled for rotation on the shield, an adjustment cam engaging the shoe and supported on the shaft, a brake lining thickness indicator comprising an indicia bearing disc rotatable concurrently with the cam and mounted on the shaft, a pin fixed to said shield and projecting outwardly therefrom, and a laterally projecting lug on the circumferential edge of said disc, said pin being disposed in the path of rotation for said lug to abut the lug and limit rotation of said indicia bearing disc.

CARL HAGEDORN.

REFERENCES CITED

The following references are of record in the file of this patent:

UNITED STATES PATENTS

| Number | Name | Date |
|---|---|---|
| 562,260 | Toquet | June 16, 1896 |
| 1,489,252 | Hough | Apr. 8, 1924 |
| 1,826,482 | Rummel | Oct. 6, 1931 |
| 1,956,039 | Loughead | Apr. 24, 1934 |
| 1,977,334 | Berejkoff et al. | Oct. 16, 1934 |
| 1,996,248 | La Brie | Apr. 2, 1935 |
| 2,002,139 | Des Rosiers | May 21, 1935 |
| 2,082,229 | Stoner | June 1, 1937 |
| 2,084,401 | La Brie et al. | June 22, 1937 |
| 2,241,163 | Rouch | May 6, 1941 |
| 2,330,004 | Neville | Sept. 21, 1943 |
| 2,334,137 | Wagner et al. | Nov. 9, 1943 |
| 2,379,796 | Freeman et al. | July 3, 1945 |